US007003380B2

(12) United States Patent
MacMartin et al.

(10) Patent No.: US 7,003,380 B2
(45) Date of Patent: Feb. 21, 2006

(54) SYSTEM FOR COMPUTATIONALLY EFFICIENT ADAPTATION OF ACTIVE CONTROL OF SOUND OR VIBRATION

(75) Inventors: Douglas G. MacMartin, San Gabriel, CA (US); William Arthur Welsh, New Haven, CT (US); James W. Fuller, Amston, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 551 days.

(21) Appl. No.: 10/084,254

(22) Filed: Feb. 27, 2002

(65) Prior Publication Data

US 2003/0060903 A1 Mar. 27, 2003

Related U.S. Application Data

(60) Provisional application No. 60/271,785, filed on Feb. 27, 2001.

(51) Int. Cl.
*G01M 1/38* (2006.01)
*G05B 13/00* (2006.01)
*G05B 15/00* (2006.01)
*G05B 21/00* (2006.01)
*G05D 23/00* (2006.01)

(52) U.S. Cl. .......................... 700/280; 700/29; 700/28; 700/32; 702/109; 702/196; 702/56; 244/1 N

(58) Field of Classification Search ................ 700/280, 700/29, 28, 32; 702/109, 196, 56; 244/1 N, 244/1 R, 134 D, 134 R
See application file for complete search history.

(56) References Cited

U.S. PATENT DOCUMENTS 5,347,586 A 9/1994 Hill et al.
5,526,292 A * 6/1996 Hodgson et al. ............ 700/280
5,558,298 A 9/1996 Pla et al.
5,724,239 A 3/1998 Kaneko
5,748,847 A 5/1998 Lo
5,834,918 A * 11/1998 Taylor et al. ............... 318/601
5,940,519 A 8/1999 Kuo (Continued)

FOREIGN PATENT DOCUMENTS

EP 0637803 A2 2/1995

OTHER PUBLICATIONS

Millott, Thomas A., Welsh, William A., Yoerkie, Jr., Charles A., MacMartin, Douglas G., Davis, Mark W., Flight Test of Active Gear-Mesh Noise Control on the S-76 Aircraft, United Technologies Research Center, East Hartford, CT and (Continued) . . . Sikorsky Aircraft Corporation, Stratford, CT. Presented at the American Helicopter Society 54th Ann ual Forum, Washington, D.C., May 20-22, 1998, American Helicopter Society, Inc.

(Continued)

*Primary Examiner*—Anthony Knight
*Assistant Examiner*—Thomas Pham
(74) *Attorney, Agent, or Firm*—Carlson, Gaskey & Olds

(57) ABSTRACT

In a method for reducing sensed physical variables generating a plurality of control commands are generated at a control rate as a function of the sensed physical variables. An estimate of a relationship between the sensed physical variables and the control commands is also is used in generating the plurality of control commands. The estimate of the relationship is updated based upon a response by the sensed physical variables to the control commands. The generation of the control commands involves a quadratic dependency on the estimate of the relationship and the quadratic dependency is updated based on the update to the estimate.

21 Claims, 2 Drawing Sheets

U.S. PATENT DOCUMENTS

| | | | | |
|---|---|---|---|---|
| 6,138,947 | A | 10/2000 | Welsh et al. | |
| 6,487,524 | B1 * | 11/2002 | Preuss | 702/196 |
| 6,772,074 | B1 * | 8/2004 | Millott et al. | 702/56 |
| 6,856,920 | B1 * | 2/2005 | Millott et al. | 702/56 |
| 2002/0118844 | A1 * | 8/2002 | Welsh et al. | 381/94.3 |

OTHER PUBLICATIONS

Davis, Mark W., Refinement and Evaluation of Helicopter Real-Time Self-Adaptive Active Vibration Controller Algorithms, NASA Contractor Report 3821, Aug. 1984.

* cited by examiner

SYSTEM FOR COMPUTATIONALLY EFFICIENT ADAPTATION OF ACTIVE CONTROL OF SOUND OR VIBRATION

This application claims priority to U.S. Provisional Application Ser. No. 60/271,785, filed Feb. 27, 2001.

BACKGROUND OF THE INVENTION

1. Field of the Invention

This invention relates generally to improvements in control processes used in active control applications, and active control of sound or vibration. More particularly, this invention reduces the computations associated with the adaptation process used to tune a controller to accommodate system variations by using a more efficient algorithm to implement sound and vibration control logic.

2. Background Art

Conventional active control systems consist of a number of sensors that measure the ambient variables of interest (e.g. sound or vibration), a number of actuators capable of generating an effect on these variables (e.g. by producing sound or vibration), and a computer which processes the information received from the sensors and sends commands to the actuators so as to reduce the amplitude of the sensor signals. The control algorithm is the scheme by which the decisions are made as to what commands to the actuators are appropriate. The amount of computations required for the control algorithm is typically proportional to the frequency of the noise or vibration.

Many active noise or vibration control problems, particularly those involving high frequency disturbances, have significant changes in the transfer function between actuator commands and sensor response over the system operating regime. Adaptation to these changes is required to maintain acceptable performance. The computational requirements associated with the adaptation process can be unduly burdensome. Therefore, what is needed is a system that reduces computational requirements to implement an adaptation process sufficiently rapidly to maintain performance in the presence of a rapidly time-varying system.

SUMMARY OF THE INVENTION

The present invention is directed to an apparatus and method for reducing sensed physical variables using a more efficient method for updating the transfer function. The method includes sensing physical variables and generating control commands at a control rate as a function of the sensed physical variables. An estimate of a relationship between the sensed physical variables and the control commands is generated, and this estimate is used in generating the control commands. At an adaptation rate less than or equal to the control rate, the estimate of the relationship is updated based upon a response by the sensed physical variables to the control commands. If the control commands are chosen to minimize a quadratic performance metric, then the update to the control commands is normalized to maintain constant convergence rates in different directions. This normalization factor is inversely dependent on the square of the transfer function. To minimize computations, this normalization factor can be updated less often than the adaptation rate. This method may be used to reduce vibrations in a vehicle, such as a helicopter.

Another embodiment of the present invention is directed to minimizing the computations of the control algorithm by updating the quadratic term that the normalization factor depends on, instead of recomputing it when the system estimate is updated. The invention ensures numerical stability of this update.

Yet another embodiment is directed to directly updating the normalization factor, rather than updating the quadratic term on which it depends. The normalization factor can be represented as a QR decomposition. The QR factors can be directly updated using a square root algorithm. One advantage of this technique is that the normalization factor will always be positive definite, that is, that theoretically negative feedback gains are computed as negative feedback gains.

DETAILED DESCRIPTION

Control systems consist of a number of sensors which measure ambient vibration (or sound), actuators capable of generating vibration at the sensor locations, and a computer which processes information received from the sensors and sends commands to the actuators which generate a vibration field to cancel ambient vibration (generated, for example by a disturbing force at the helicopter rotor). The control algorithm is the scheme by which the decisions are made as to what the appropriate commands to the actuators are.

Figure 1:
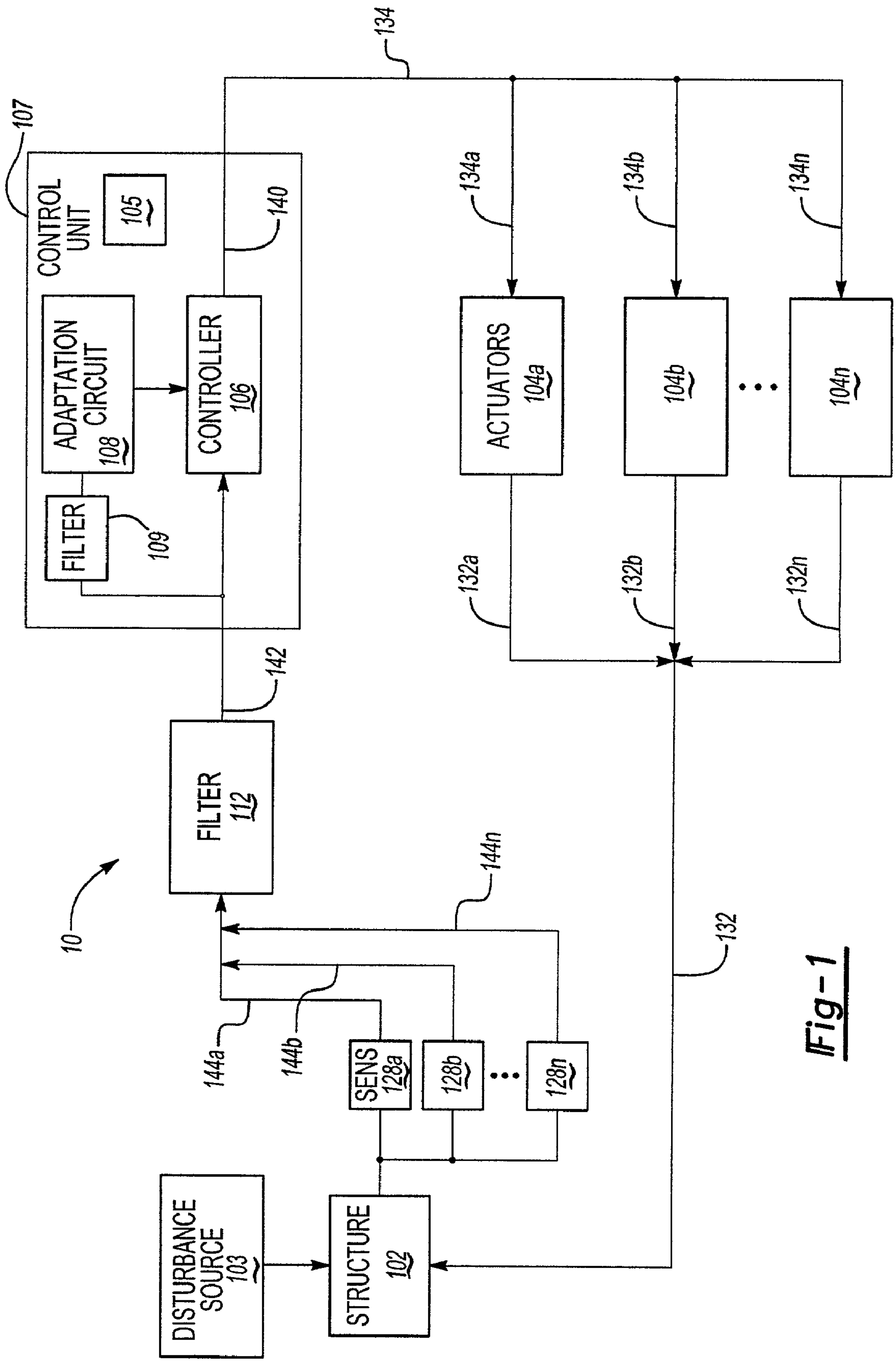
FIG. 1 shows a block diagram of the noise control system of the present invention.

FIG. 1 shows a block diagram 10 of an active control system. The system comprises a structure 102, the response of which is to be controlled, sensors 128, filter 112, control unit 107 and actuators (which could be force generators) 104. A disturbance source 103 produces undesired response of the structure 102. In a helicopter, for example, the undesired disturbances are typically due to vibratory aerodynamic loading of rotor blades, gear clash, or other source of vibrational noise. A plurality of sensors 128(*a*) . . . (*n*) (where n is any suitable number) measure the ambient variables of interest (e.g. sound or vibration). The sensors (generally 128) are typically microphones or accelerometers, or virtually any suitable sensors. Sensors 128 generate an electrical signal that corresponds to sensed sound or vibration. The electrical signals are transmitted to filter 112 via an associated interconnector 144(*a*) . . . (*n*) (generally 144). Interconnector 144 is typically wires or wireless transmission means, as known to those skilled in the art.

Filter 112 receives the sensed vibration signals from sensors 128 and performs filtering on the signals, eliminating information that is not relevant to vibration or sound control. The output from the filter 112 is transmitted to control unit 107, which includes adaptation circuit 108 and controller 106, via interconnector 142. In the present invention, a filter 109 is placed before adaptation circuit 108, as will be described below. The controller 106 generates control signals that control force generators 104(*a*) . . . (*n*).

A plurality of actuators 104(*a*) . . . (*n*) (where n is any suitable number) are used to generate a force capable of affecting the sensed variables (e.g. by producing sound or vibration). Force generators 104(*a*) . . . (*n*) (generally 104) are typically speakers, shakers, or virtually any suitable actuators. Actuators 104 receive commands from the controller 106 via interconnector 134 and output a force, as shown by lines 132(*a*) . . . (*n*) to compensate for the sensed vibration or sound produced by vibration or sound source 103.

The control unit 107 is typically a processing module, such as a microprocessor. Control unit 107 stores control algorithms in memory 105, or other suitable memory location. Memory 105 is, for example, RAM, ROM, DVD, CD, a hard drive, or other electronic, optical, magnetic, or any other computer readable medium onto which is stored the control algorithms described herein. The control algorithms are the scheme by which the decisions are made as to what commands to the actuators 104 are appropriate, including those conceptually performed by the controller 107 and adaptation circuit 108. Generally, the mathematical operations described in the Background, as modified as described below, are stored in memory 105 and performed by the control unit 107. One of ordinary skill in the art would be able to suitably program the control unit 107 to perform the algorithms described herein. The output from the adaptation circuit 108 can be filtered before being sent to the controller 107.

For tonal control problems, computations can be performed at an update rate lower than the sensor sampling rate as described in co-pending Patent Application entitled "Computationally Efficient Means for Active Control of Tonal Sound or Vibration", which is commonly assigned. This approach involves demodulating the sensor signals so that the desired information is near DC (zero frequency), performing the control computation, and remodulating the control commands to obtain the desired output to the actuators.

The number of sensors is given by $n_s$ and the number of force generators is $n_a$. The complex harmonic estimator variable that is calculated from the measurements of noise or vibration level can be assembled into a vector of length $n_s$ denoted $z_k$ at each sample time k. The control commands generated by the control algorithm can likewise be assembled into a vector of length $n_a$ denoted $u_k$. The commands sent to the force generators are generated by multiplying the real and imaginary parts of this vector by the cosine and sine of the desired frequency.

In the narrow bandwidth required for control about each tone, the transfer function between force generators and sensors is roughly constant, and thus, the system can be modeled as a single quasi-steady complex transfer function matrix, denoted T. This matrix of dimension $n_s$ by $n_a$ describes the relationship between a change in control command and the resulting change in the harmonic estimate of the sensor measurements, that is, $\Delta z_k = T\ \Delta u_k$. For notational simplicity, define $y_k = \Delta z_k$, and $v_k = \Delta u_k$. The complex values of the elements of T are determined by the physical characteristics of the system (including force generator, or actuator, dynamics, the structure and/or acoustic cavity, and anti-aliasing and reconstruction filters) so that $T_{ij}$ is the response at the reference frequency of sensor i due to a unit command at the reference frequency on actuator j. Many algorithms may be used for making control decisions based on this model. For example, one active noise and vibration control (ANVC) approach is described below. The control law is derived to minimize a quadratic performance index:

$$J = z^H W_z z + u^H W_u u + v^H W_{\delta u} v$$

where $W_z$, $W_u$ and $W_{\delta u}$ are diagonal weighting matrices on the sensor, control inputs, and rate of change of control inputs, respectively. A larger control weighting on a force generator will result in a control solution with smaller amplitude for that force generator.

Solving for the control which minimizes J yields:

$$u_{k+1} = u_k - Y_k (W_u u_k + T_k^H W_z z_k)$$

where $$Y_k = (T_k^H W_z T_k + W_u + W_{\delta u})^{-1}$$

Solving for the steady state control ($u_{k+1} = u_k$) yields $$u = -(T^H T + W_u)^{-1} T^H z_0$$

The matrix $Y_k$ determines the rate of convergence of different directions in the control space, but does not affect the steady state solution. This recursive least-squares (RLS) control law attempts to step to the optimum in a single step, and behaves better with a step-size multiplier $\beta < 1$. A least means square (LMS) gradient approach would give $Y_k = I$. For poorly conditioned T matrices, the equalization of convergence rates for different directions that is obtained with the RLS approach is critical. Decreasing the control weighting, $W_u$, increases the low frequency gain, and decreasing the weighting on the rate of change of control, $W_{\delta u}$, increases the loop cross-over frequency (where frequency refers to the demodulated frequency).

The performance of this control algorithm is strongly dependent on the accuracy of the estimate of the T matrix. When the values of the T matrix used in the controller do not accurately reflect the properties of the controlled system, controller performance can be greatly degraded, to the point in some cases of instability.

An initial estimate for T can be obtained prior to starting the controller by applying commands to each actuator and examining the response on each sensor. However, in many applications, the T matrix changes during operation. For example, in a helicopter, as the rotor rpm varies, the frequency of interest changes, and therefore the T matrix changes. For the gear-mesh frequencies, variations of 1 or 2% in the disturbance frequency can result in shifts through several structural or acoustic modes, yielding drastic phase and magnitude changes in the T matrix, and instability with any fixed-gain controller (i.e., if $T_{k+1} = T_k$ for all k). Other sources of variation in T include fuel burn-off, passenger movement, altitude and temperature induced changes in the speed of sound, etc.

There are several possible methods for performing on-line identification of the T matrix, including Kalman filtering, an LMS approach, and normalized LMS. A residual vector can be formed as $$E = y - Tv$$

where no notational distinction is made between the estimated T matrix (available to the control algorithm), and the true physical T matrix; all of the control equations are assumed to be computed with the best estimate available. The estimated T matrix is updated according to:

$$T_{k+1} = T_k + EK^H$$

The different estimation schemes differ in how the gain matrix K is selected. The Kalman filter gain K is based on the covariance of the error between the true T matrix and the estimated T matrix. This covariance is given by the matrix P where $P_0 = I$, and $$M = P_k + Q$$

$$K = Mv/(R + v^H M v)$$

$$P_{k+1} = M - Kv^H M$$

and the matrix Q is a diagonal matrix with the same dimension as the number of force generators, and typically with all diagonal elements equal. The scalar R can be set equal to one with no loss in generality provided that both Q and R are constant in time. The normalized LMS approach is simpler, with the gain matrix K given by:

$$K=Qv/(1+v^HQv)$$

The computational burden associated with updating $T_k$ is roughly $2n_an_s$ (using the normalized LMS gain rather than the Kalman filter gain). This is not overly burdensome, and cannot be readily avoided. However, the update equation for $u_{k+1}$ requires not only $T_k$, but the triple product $T_k^HW_zT_k$ and the inverse $(T_k^HW_zT_k+W_u+W_{\delta u})^{-1}$. These two steps are computationally intensive, but potentially amenable to some straightforward investigation. First, the inverse need not be computed directly. Since $Y_k^{-1}=(T_k^HW_zT_k+W_u+W_{\delta u})$ is Hermitian, the required product can be obtained by first computing the Cholesky decomposition, from which the required product can be obtained by back-substitution. The Cholesky decomposition requires roughly $n_a^3/6$ floating point operations (flops), plus computations on the order of $n_a^2$. Another significant modification that appears to be straightforward is to propagate $X_k=T_k^HW_zT_k$, rather than computing the matrix multiplication at each step. Given that T has a rank one update, $T_{k+1}=T_k+EK^H$, then $X_{k+1}$ satisfies $$X_{k+1}=X_k+(T_k^HW_zE)K^H+K(T_k^HW_zE)^H+K(E^HW_zE)K^H$$

However, without further modification, this equation is numerically unstable and cannot be implemented. Random numerical errors due to round-off or truncation that are introduced at each step accumulate until eventually, $X_k$ diverges from $T_k^HW_zT_k$, potentially leading to instability of the overall algorithm.

Without modifications, the computations of the overall algorithm remain significant, and for many applications, the resulting burden is unacceptable. An algorithm is desired that gives equivalent performance, with much lower computation.

One embodiment of the present invention is directed to reducing the computational burden. The primary difficulty with the baseline algorithm for noise control is the computational burden. This is driven by the computation of $T^HT$, and by the solution of the equation for u. Assume that $W_u$, $W_{\delta u}$, $W_z$ and Q are all diagonal matrices. If the matrix-multiplication is computed directly, and a Cholesky decomposition used to solve for u, then the computational burden of the algorithm in flops is roughly $n_a^3/6+n_a^2n_s+3n_a^2+3n_an_s$, ignoring vector computations which are linear in $n_a$ or $n_s$. As noted in the algorithm derivation, the matrix $Y_k$ affects only the convergence rate, and not the converged solution. Therefore, it does not need to be updated at the same rate as the control and adaptation. Splitting the computation of the Cholesky decomposition over several control iterations reduces the computations per iteration. For example, the Cholesky decomposition can be split over 4 steps. Performing all of the adaptation at a lower rate is also possible. However, noting that the two different uses of the estimated T matrix (i.e. for computing the gradient, and for normalizing the directions) result in different demands on the accuracy of T leads to better use of the available computation. The matrices $W_u$ and $W_{\delta u}$ can be time varying, but can only be changed during an iteration when the Cholesky decomposition is updated (that is, the $W_u$ used to compute a must be the same as that used to compute the Cholesky factors).

Another embodiment of the invention is directed to using the update equation for X. Since numerical errors will always be introduced at every step, over time, $X_k$ will gradually diverge from $T_k^HT_k$. (The dynamics associated with the propagation of numerical error in the above equation are neutrally stable.) To prevent this divergence, the update equation for X can be modified so that it depends on X itself. The form of the above update equation will guarantee that X is positive definite and Hermitian, and any modification must maintain this behavior. Noting that $T^HW_zE=T^HW_zy-T^HW_zTv$, then define instead $E_x=T^HW_zy-X_v$ and substitute this into the previous update equation for X. The resulting equation will still guarantee that $X_{k+1}$ is positive definite and Hermitian, and X will still satisfy $X=T^HW_zT$ except for numerical errors. However, an analysis of the error propagation reveals that the error behavior is now strictly stable, and thus cannot accumulate indefinitely.

Another embodiment of the present invention is a more efficient computation for a control update algorithm. The definition of E, above involves $T_k^HW_zy=T_k^HW_zz_k-T_k^HW_zz_{k-1}$. Since the control update equation already computes $F_k=T_k^HW_zz_k$, then E, can be computed as:

$$E_x=F_k-F_{k-1}F_c-Xv$$

where the correction term $F_c$ is given by $F_c=K_{k-1}E_{k-1}^HW_zz_{k-1}$. This computation involve only vector computations, and is thus efficient.

The update equation for $X_{k+1}$ involves 3 terms, each corresponding to $n^2/2$ computations accounting for symmetry. However, these terms can be grouped to form 2 rank 1 updates, rather than 3. Modifying the definition of $E_x$ gives us:

$$E_x=F_k-F_{k-1}-F_c-Xv+(E^HW_zE)K/2$$

$$X_{k+1}=X_k+E_xK^H+KEx^H$$

The above equations assume that $W_z$ is diagonal and constant. However, if $W_z$ is allowed to be time-varying, then the update equations for X must change. If complete freedom is allowed in the time variation, then no computational simplifications from the above steps can be applied. However, if one permits only a single element of $W_z$ to change at each iteration, then the change in X can be computed via a computationally efficient rank one update. If the kth element of $W_z$ increases by $(\Delta W_z)_k$, then the modification to X can be computed as follows, where $T_k$ refers to the $k^{th}$ row of the T matrix:

$$X_{new}=X_{old}+(\Delta W_z)_kT_k^HT_k$$

Examining the behavior of the adaptation, the diagonal elements of the covariance are most important, and the off-diagonal elements have little impact on performance. Making the covariance a real vector consisting of only the diagonals saves $2n_a^2$ operations. Further simplifications to eliminate the time-varying covariance P results in an equation identical to the normalized LMS approach described previously.

Incorporating all of the above modifications results in an algorithm with roughly $7n^2$ operations per step; an improvement of roughly a factor of 6 over the original algorithm, with almost no change in the behavior of the algorithm. To summarize, the new equations are as follows:

$$F_k = T_k^H W_z z_k;$$

$$S_H S = Chol(X_k + W_u + W_{\delta u}) \text{ (every 4 iterations)};$$

$$u_{k+1} = u_k - (S^H S)^{-1}(W_u u_k + F_k) \text{ (the product is computed via back-substitution)};$$

$$v = \Delta u;$$

$$y = \Delta z;$$

$$E = y - T_k v;$$

$$K = Q/(1 + v^H Q v);$$

$$T_{k+1} = T_k + EK^H;$$

$$F_c = K_{k-1} E_{k-1}^H W_z z_{k-1};$$

$$E_x = F_k - F_{k-1} - F_c - Xv + (E^H W_z E)K/2;$$

$$X_{k+1} = X_k + E_x K^H + K E_x^H; \text{ and}$$

$$X_{new} = X_{old} + (\Delta W_z)_k T_k^H T_k.$$

Ignoring vector and scalar operations, the total computational burden associated with the current algorithm is:

| | |
|---|---|
| Control update: | 1 matrix-vector multiply ($n_a n_s$) |
| Cholesky back-substitution | ($na^2$) |
| Cholesky decomposition: | $n_a 3/6$, split over 4 steps |
| Residual calculation: | 1 matrix-vector multiply ($n_a n_s$) |
| Adaptation filter gain: | vector operations only |
| Update of T estimate: | 1 vector outer product ($n_a n_s$) |
| Computation of Ex: | 1 matrix-vector multiply ($n_a^2$) |
| Computation of X: | 2 symmetric outer products ($n_a^2$) |

sym. outer product for variable $W_z$ ($n_a^2/2$)

Another embodiment of the present invention is directed to improving the efficiency of calculations by using a square-root algorithm that enables a controller 106 to achieve the same attenuation of a physical variable, such as noise, sound or vibration while using less expensive computer hardware. Alternatively, the same computer hardware can be used to control approximately twice as many modes of vibration or sound. This algorithm achieves the same net computation precision as algorithms for quasi-steady control logic, but with computer hardware that is only half as precise in each operation. For example, if double precision, floating point arithmetic is required for a particular control algorithm, this algorithm would only require single precision arithmetic. Since single precision operations are much faster, the same controller can be implemented with a slower, less expensive computer. The algorithm described herein allows lower cost active noise and vibration control systems.

In addition to doubling the precision, the algorithm described herein is an inherently more stable implementation. In conventional algorithms, numerical errors can cause modes that are theoretically stable to become unstable. For these modes, the numerical errors cause slightly stable negative feedback gains to be computed as slightly positive feedback gains and, thus, they become unstable. Due to the nature of the numerical method in the square root algorithm, theoretically negative feedback gains are computed as negative feedback gains despite numerical errors.

Most active controllers of sound and/or vibration are based on quasi-steady control logic. That is the source of the sound and vibration is a persistent excitation of one or more discrete frequencies that vary relatively slowly. The amplitudes and phases of the discrete frequencies take one or more seconds to change significantly. The algorithm described herein applies to quasi-steady control logic.

Quasi-Steady Control Logic

Quasi-steady control logic refers to optimal control logic for multi-variable systems assumed to have transfer functions that do not vary within the frequency range that needs to be controlled. Quasi-steady control logic is commonly used in sound and vibration control because the transfer functions relating actuator inputs to microphone or accelerometer outputs do not vary significantly in a narrow frequency band about the frequency of one of the discrete frequency disturbances. If there are multiple discrete tones that need to be attenuated, the controller would use a separate control logic for each. For each tone, the system is modeled by a transfer function that consists of a matrix of constant gains. For convenience, the m inputs, $u_n$, and p outputs, $y_n$, are modeled with separate real and imaginary parts and thus the p×m transfer function matrix, T, consists of real numbers. Alternatively, complex gains could be used.

The optimal control problem is to minimize the performance index, J, at time n through selection of a perturbation, $\Delta u_n$ to the control signal, where:

$$Jn = 0.5*(y_n^T * y_n + \Delta u_n^T * W * \Delta u_n);$$

$$y_n = T\Delta u_n + y_{n-1}; \text{ and}$$

$$u_n = u_{n-1} + \Delta u_n.$$

W is a real and positive semi-definite m x m control effort weighting matrix. The optimal control is that which causes:

$$\delta Jn/\delta\Delta u_n = (\delta y_n/\delta\Delta u_u)^T * y_n + W*\Delta u_n = 0.$$

This implies the optimal control is:

$$\Delta u_n = -(T^T * T + W)^{-1} * T^T * y_{n-1}.$$

In noise and vibration control the control logic is made adaptive by estimating the values of T. As discussed herein, T refers to the estimate of the transfer function matrix. Assuming that each element of the transfer function is a Brownian random variable, the minimum variance estimate of it at time n+1, $T_{n+1}$, is:

$$T_{n+1} = T_n + E_n * L^T,$$

where $E_n = y_n - yp_n$ are the innovations, $yp_n = T_n * \Delta u_n + y_{n-1}$, is the predicted value of y at time n, and L is a m×1 matrix of constant gains. This type of estimator is a Kalman filter.

In summary, the adaptive quasi-steady control logic is:

$$T_n = T_{n-1} + (y_n - yp_n) * L^T,$$

$$\Delta u_n = -(T_n * T_n + W)^{-1} * T^T_n * y_n \tag{1}$$

$$yp_{n+1} = y_n + T^T_n * \Delta u_n$$

$$u_n = u_n + \Delta u_n$$

Formulation as a QR Problem

The control logic can be reformulated in terms of a matrix decomposition into the product of a orthonormal matrix, Q, and a upper triangular matrix, R. This is called a QR decomposition. The symmetric, positive definite m×m matrix, $Y_n$ will be decomposed and propagated via a square root method where:

$$Y_n=(W+T_n^TT_n)^{-1}$$

Propagating $Y_n$ $Y_n$ can be propagated using the following recursive relationship. Combining the definition of $Y_n$ and the Kalman filter update for $T_n$ yields:

$$Y_n^{-1}=Y_{n-1}^{-1}+LE_n^TT_{n-1}+T_{n-1}^TE_nL^T+LE_n^TE_nL^T,$$

which can be more compactly expressed as:

$$Y_n^{-1}=Y_{n-1}^{-1}+c_np^{-2}c_n^T-b_{n-1}p^{-2}b_{n-1}^T,$$

using the definitions:

$c_n=T_n^TE_n$;

$d_{n-1}=T_{n-1}^TE_n$; and $p^2=E_n^TE_n$.

Collecting the time n terms of the Y propagation equation into the left hand side, inverting both sides of the resulting equation, and using the matrix inversion lemma yields the Y propagation equation:

$$Y_n+Y_nc_nr_n^2c_n^TY_n=Y_{n-1}Y_{n-1}d_{n-1}v_{n-1}^2d_{n-1}^TY_{n-1}, \quad (2)$$

where $r_n$ and $v_{n-1}$ are defined as:

$r_n^2=(p^2-c_n^TY_nc_n)^{-1}$; and $v_{n-1}^2=(p^2-d_{n-1}^TY_{n-1}d_{n-1})^{-1}$.

To present this as a QR decomposition, each term must be expressed in the quadratic form $c^Tc$, where c is real. Since $Y_n$ and $Y_{n+1}$ are positive semi-definite and symmetric, real upper triangular matrices, $R_n$ and $R_{n-1}$ can be defined such that:

$R_n^TR_n=Y_n$; and $R_{n-1}^TR_{n-1}=Y_{n-1}$

These are known as a Cholesky decompositions. Putting the remaining terms in quadratic form only requires that, $r_n$ and $v_{n-1}$, be real. Using the definitions of Y, c, and r, $$r_n^2=p^2-E_n^TT_n(W+T_n^TT_n)^{-1}T_nE_n= E_n^T(I-T_n(W+T_n^TT_n)^{-1}T_n^T)E_n=E_n^T(I-T_nW^{-1}(I+T^T{}_nT_nW^{-1})^{-1}T^T{}_n)E_n=E_n^T((I+T_nW^{-1}T^T{}_n)^{-1}(I+T_nW^{-1}T^T{}_n)-T_nW^{-1}T^T{}_n(I+T_nW^{-1}T^T{}_n)^{-1})E_n=E_n^T(I+T^nW^{-1}T^T{}_n)^{-1}E_n.$$

This result is positive because the matrix within the parenthesis is symmetric and positive definite. Thus $r_n$ will be real. $v_{n-1}$ can be shown to be real following the same procedure.

The Y propagation equation can be put in the following quadratic form:

$$\begin{bmatrix} r_nc_n^TY_n \\ R_n \end{bmatrix}^T * \begin{bmatrix} r_nc_n^TY_n \\ R_n \end{bmatrix} = \begin{bmatrix} v_{n-1}d_{n-1}^TY_{n-1} \\ R_{n-1} \end{bmatrix}^T * \begin{bmatrix} v_{n-1}d_{n-1}^TY_{n-1} \\ R_{n-1} \end{bmatrix}.$$

This can be put in the form of QR decomposition by adding an appropriate column vector as follows:

$$\begin{bmatrix} r_n & r_nc_n^TY_n \\ 0 & R_n \end{bmatrix} = Q^T * \left\{ \begin{bmatrix} v_{n-1} & v_{n-1}d_{n-1}^TY_{n-1} \\ 0 & R_{n-1} \end{bmatrix} * \begin{bmatrix} 1 & 0 \\ L & I \end{bmatrix} \right\} \quad (3)$$

where Q is an orthonormal matrix. If each side of Equation (3) is multiplied on its left by its transpose, the equation above is one if the results. However, Equation (3) allows the following algorithm to be used for the propagation. Starting with the upper triangular matrix on the right hand side of Equation (3) from time n−1 it is converted to the first matrix on the left hand side of the time n equation replacing the first row with the terms shown. This is how the new information inherent in the measurement $y_n$ is entered into the square root propagation. Next, it is multiplied on the right by the matrix containing L.

Finally, a series of orthonormal row operations are performed on the resultant matrix to produce an upper triangular matrix. These row operations can be collected into the form of an orthonormal matrix, $Q^T$, pre-multiplying the matrix. This final operation is termed a QR decomposition. The resulting upper triangular matrix has the form of the time n−1 result, but with its values updated to time n. Q does not need to be actually formed. Instead of propagating Y, its square root, R, is propagated instead. For this reason the numerical precision needed to propagate Y in a computer implementation is reduced by approximately half. The control logic contains the term $Y_nT_n^Ty_n$. This can be put in terms of one of the results of the QR decomposition, saving some computations.

$$Y_nT_n^Ty_n=Y_nT_n^T(E_n+yp_n)=Y_nT_n^TE_n+Y_n(T_{n1}^T+LE_n^T)$$
$$yp_n=Y_nr_n-Y_n(W\Delta u_{n-1}-LE_n^Typ_n)$$

using $$T_{n-1}^Typ_n=(I-T_{n-1}^TT_{n-1}(W+T_{n-1}^TT_{n-1})^{-1})$$
$$T_{n-1}^Ty_{n-1}=W(W+T_{n-1}^TT_{n1})^1T_{n-1}^Ty_{n-1}=-W\Delta u_{n-1}$$

The remaining control algorithm, including the Kalman filter is:

$$\Delta u_n=-Y_nr_n+Y_n(W\Delta_{n-1}-LE_n^Typ_n)$$

$$T_n=T_{n-1}+E_n*L^T, \quad (4)$$

$$yp_{n+1}=y_n+T_n\Delta u_n.$$

Equations (3) and (4) are the control logic of Equation (1) reformulated as a QR decomposition.

These QR equations can be confirmed by multiplying each side of the equation on the left with their respective transpose matrix. This yields a block symmetric matrix equation with the Y propagation equation, Equation 2, appearing in the lower right block. It remains to show that the off-diagonal and upper left blocks are consistent with Equation 2.

The off-diagonal submatrix from the right hand side is $$(1+L^TY_{n-1}d_{n-1})v_{n-1}^2d_{n-1}^TY_{n-1}+L^TY_{n-1}= v_{n-1}^2d_{n-1}^TY_{n-1}+p^{-2}(c_n^T-d_{n-1}^T)(Y_{n-1}+Y_{n-1}d_{n-1}v_{n-1}^2d_{n-1}^TY_{n-1})$$

where $E_n$ was expressed in terms of $c_n$ and $d_{n-1}$. Factoring the above into $c_n$ and $d_{n-1}$, components yields $$p^{-2}c_n^T(Y_{n-1}+Y_{n-1}d_{n-1}v_{n-1}^2d_{n-1}^TY_{n-1})+(q_{n-1}^2-p^{-2}(1+d_{n-1}^TY_{n-1}d_{n-1}v_{n-1}^2))d_{n-1}^TY_{n-1}$$

The second term is zero. Substituting in Equation (2) into the first term yields $$p^{-2}c_n^T*(Y_n+Y_nc_nr_n^2c_n^TY_n)=p^{-2}(1+c_n^T*Y_n*c_n*r_n\mathbf{2})*c_n^T*Y_n=r_n^2*c_n^T*Y_n.$$

Which is the off-diagonal term on the left hand side of Equation (3).

The upper left submatrix from the right hand side of the QR formulation is $$(1+L^T Y_{n-1} b_{n-1}) q_{n-1}^2 (1+b_{n-1}^T Y_{n-1} L)+L^T y_{n-1} L$$

Substituting in the relation to $d_{n-1}$, and $c_n$ for the post multiplication by L, and factoring yields $$((1+L^T Y_{n-1} d_{n-1}) v_{n-1}^2 d_{n-1}^T Y_{n-1}+L^T Y_{n-1}+ (1+L^T Y_{n-1} d_{n-1}) v_{n-1}^2 (p^2-d_{n-1}^T Y_{n-1} d_{n-1}) p^{=-2}-L^T Y_{n-1} d_{n-1} p^{-2}$$

The term in the outside parentheses is the off-diagonal term. Substituting in the off-diagonal result and using the definition of $q_k^2$ twice results in $$(1+r_n^2 c_n^T Y_n c_n) p^{-2}=r_n^2.$$

Which is the upper left submatrix on the left hand side of Equation (3).

Modified Givens Method

Any matrix can be decomposed into an orthonormal, matrix, Q, pre-multiplying an upper triangular matrix, R. In Equation (3) the (m+1)×(m+1) matrix to be decomposed:

$$\begin{bmatrix} v_{n-1} & v_{n-1} d_{n-1}^T Y_{n-1} \\ 0 & R_{n-1} \end{bmatrix} * \begin{bmatrix} 1 & 0 \\ L & I \end{bmatrix}$$

is almost in upper triangular form. The only exception is that the first column has nonzero entries. A matrix in this form can be decomposed into Q and R with far fewer computations than required for a general matrix. The following approach modifies the known Given's method of QR decomposition for a general matrix to exploit the sparsity of the lower triangular portion of the above matrix. Decomposition is accomplished by choosing Q to consist of a sequence of Given's transformations. Each Given's transform produces one zero in the matrix, by operating on two matrix rows with a Given's rotation. Each Given's transform has the form $$Q_i = \begin{bmatrix} 1 & & & & & \\ & \ddots & & 0 & & \\ & & 1 & & & \\ & & & G_i & & \\ & & & & 1 & \\ & 0 & & & \ddots & \\ & & & & & 1 \end{bmatrix} \text{ where}$$

$$G_i = \begin{bmatrix} \frac{a}{\sqrt{a^2+b^2}} & \frac{b}{\sqrt{a^2+b^2}} \\ \frac{-b}{\sqrt{a^2+b^2}} & \frac{a}{\sqrt{a^2+b^2}} \end{bmatrix} \text{ Then}$$

$$G_i * \begin{bmatrix} x & \dots & x & a & x & \dots & x \\ x & \dots & x & b & x & \dots & x \end{bmatrix} =$$

$$\begin{bmatrix} x & \dots & x & \sqrt{a^2+b^2} & x & \dots & x \\ x & \dots & x & 0 & x & \dots & x \end{bmatrix}$$

The sequence of Given's rotations consists of a reverse pass sequence followed by forward pass sequence. The first Given's rotation operates on the last two rows of the matrix to make the last row of the first column zero. The next in the reverse sequence operates on the m−1 and m rows to make the m row of the first column zero, and so on until the 3rd row of the first column is zero. The result of this backward sequence of orthonormal transformations is a matrix with zeros in the first column as needed, but with nonzero entries along the sub-diagonal below the main diagonal. The forward sequence puts these sub-diagonal terms back to zero without disturbing the zeros in the first column.

The first Given's rotation of the forward sequence operates on the first two rows of the matrix to make the second row of the first column zero, the next operates on the 2nd and 3rd rows to make the 3rd row of the 2nd column zero, and so on until the last row of the second last column is zero. The resulting matrix is now in upper triangular form and therefore it is $$\begin{bmatrix} r_n & r_n c_n^T Y_n \\ 0 & R_n \end{bmatrix}$$

Note that the orthonormal matrix, Q, does not need to be explicitly computed. The number of computer operations required varies with the number of sensors, p, and the number of actuators, m. In estimating the number of computer operations only square root operations and multiplications and divisions, termed an op, will be counted. Multiplications by zero do not have to be done and are not counted. It takes four multiplication's and one square root to determine each Givens transformation. Performing the reverse sequence transformation on the j and j+1 rows requires 2+4*(m−j+1) ops, for a total of 10+4*(m−j) plus one sqrt. In the reverse sequence, this set of operations needs to repeated for j=m, m−1, . . . , 2. Thus, the reverse sequence requires $2m^2+4m-6$ ops and m−1 square roots. Similarly, the forward sequence requires $2m^2+6m$ ops and m square roots. Thus, the Given's method of QR decomposition for the spare matrix requires $4m^2+10m-6$ ops and 2m−1 sqrts.

Numerical Stability

Theoretically, the matrix Y has all positive singular values. However, numerical errors in directly computing can result in small positive singular values becoming small negative singular values. This might make a theoretically stable sound and vibration control system unstable. The square-root method avoids this potential problem by not forming Y but using its square root instead. In spite of numerical errors the square root matrix, R, will only contain real values. Thus, $R^T R$ can have only positive singular values.

Algorithm and Operation Count

The algorithm for the $n^{th}$ time point is:

| Operation Sequence | Op Count |
|---|---|
| $E = (y_n - yp_n)$ | 0 |
| $p^2 = E^T E$ | p |
| $d = T^T E$ | mp |
| R*d | $(m^2 + m)/2$ (since R is upper triangular) |
| $v = \text{sqrt}(p^2 - (R*d)^T (R*d))$ | m + 1 sqrt |
| $R^T (R*d) *v$ | $(m^2 + m)/2 + m$ |
| $v_n + (Y*d*v)_n^T * L$ | m |
| $R_n * L$ | $((m^2 + m)/2$ |
| m + 1 order QR | $4m^2 + 10m - 6$ ops and 2m − 1 sqrt |
| $u_n = u_{n-1} - Y_n r_n + R^T R$ $(W\_u_{n-1} - LE_n^T yp_n)$ | $m^2 + 4m + p$ |
| $T_n = T_{n+1} + E_n * L^T$ | m*p |
| $yp_{n+1} = y_n + T_{n}\_u_n$ | m*p |

-continued

| Operation Sequence | Op Count |
|---|---|
| total | 2m sqrts plus (6.5 m$^2$ + 3 m*p + 17.5 m + 2p − 6) ops |

input data: $y_n$ in memory from n−1 calculations: $S_n$, $yp_n$, $T_n$, $q_n$, $(q*Z*b)_n$, $u_n$.

constants: L, r, $W^{-1}$ (W is assumed to be a diagonal matrix).

The square root method requires fewer computer operations than other algorithms implementing the adaptive quasi-steady vibration and/or noise control logic. The logic, described in Equation (1), is repeated here for convenience.

$$T_n=T_{n-1}+(y_n-yp_n)*L^T,$$

$$\Delta u_n=(T^T_n*T_n+W)^{-1}*T^T_n*y_n$$

$$yp_{n+1}=y_n+T_n*\Delta u_n$$

$$u_n=u_n+\Delta u_n$$

Simply executing this control logic as shown requires $3m*p+m^2$ operations in addition to the operations required for forming the matrix inverse. Other than the square root method disclosed here, there is no known method for forming the required inverse that uses as few as $5.5m^2+17.5m+2p-6$ops.

Alternate Formulation

By substituting $TW^{-1/2}$ for $T^T$, $W^{-1/2}L$ for $E_n$, $E_n$ for L, Z for Y and S for R an alternate form of QR formulation can be determined. In the alternate propagates the p×p matrix:

$$Z_n=(I+T_nW^{-1}T_n^T)^{-1}.$$

Using Zn $Z_n$ can be used to compute both $\Delta u_n$ and $yp_n$. The derivation of the corresponding relations, will use the matrix equalities:

$$Y(I+XY)^{-1}=(I+YX)^{-1}Y,$$

$$\text{and } (I+V)^{-1}=I-(I+V)^{-1}V$$

which can be verified by multiplying through by the respective inverted matrices. Using these equalities $$Z_n=(I+T_nW^{-1}T_n^T)^{-1}=[I-T_nW^{-1}T_n^T(I+T_nW^{-1}T_n^T)^{-1}]=I-T_n(T^TT_n+W)^{-1}T_n^T$$

Comparing this to the control logic above shows that $$yp_{n+1}=Z_ny_n$$

The control, $\Delta u_{n+1}$ can also be expressed in terms of $Z_n$:

$$\Delta u_{n+1}=-W^{-1}T_n^TZ_ny_n.$$

This can be verified using the above matrix equalities once again.

$$-W^{-1}T_n^TZ_ny_n=-W^{-1}T_n^T(I+T_nW^{-1}T_n^T)^{-1}y_n=-(T^T_{n+1}T_{n+1}+W)^{-1}T_n{}^T{}_{n+1}y_n=\_u_{n+1}$$

Applying the substitutions listed above to the Y propagation equations yields the Z propagation equations $$Z_n+Z_nb_nq_n^2b_n^TZ_n=Z_{n-1}Z_{n-1}b_{n-1}q_{n-1}^2b_{n-1}^TZ_{n-1},$$

using the definitions $$q_n^2=(r^2-b_n^TZ_nb_n)^{-1},\ b_n=T_nW^{-1}L, \text{ and } r^2=L^TW^{-1}L$$

Then the dual QR formulation is $$Q*\begin{bmatrix} q_n & q_nb_n^TZ_n \\ 0 & S_n \end{bmatrix}=\begin{bmatrix} q_{n-1} & q_{n-1}b_{n-1}^TZ_{n-1} \\ 0 & S_{n-1} \end{bmatrix}*\begin{bmatrix} 1 & 0 \\ E_n & I \end{bmatrix}$$

where $Z_{n-1}=S^T_{n-1}S_{n-1}$, $yp_n=Z_{n-1}y_{n-1}$, and $E_n=y_n-yp_n$, $$yp_{n+1}=S_n^TS_ny_n$$

$$T_n=T_{n-1}+E_n*L^T,$$

$$\Delta u_n=-W^{-1}*T_n^T*yp_{n+1}.$$

The alternative form has the advantage that after the substitutions $v_n=r_n$, $d_n=c_n$, and r is constant. Therefore the computations shown in the table rows 2 through 6 do not need to be performed. It has the disadvantage that the QR decomposition is on a p+1 square matrix rather than the normally smaller m+1. The op count for the alternative formulation is found by switching the roles of m and p in the remainder of the table: $5.5p^2+2$ mp+12.5p+m−6 ops. Generally, this form only has an advantage in operation count if $p<1.18*m$.

Adaptive quasi-steady vibration and/or noise control with square-root filtering is extremely attractive for implementation. The square root algorithm can provide a desired level of computation performance with significantly less computer power. It is also more numerically stable.

Figure 2:
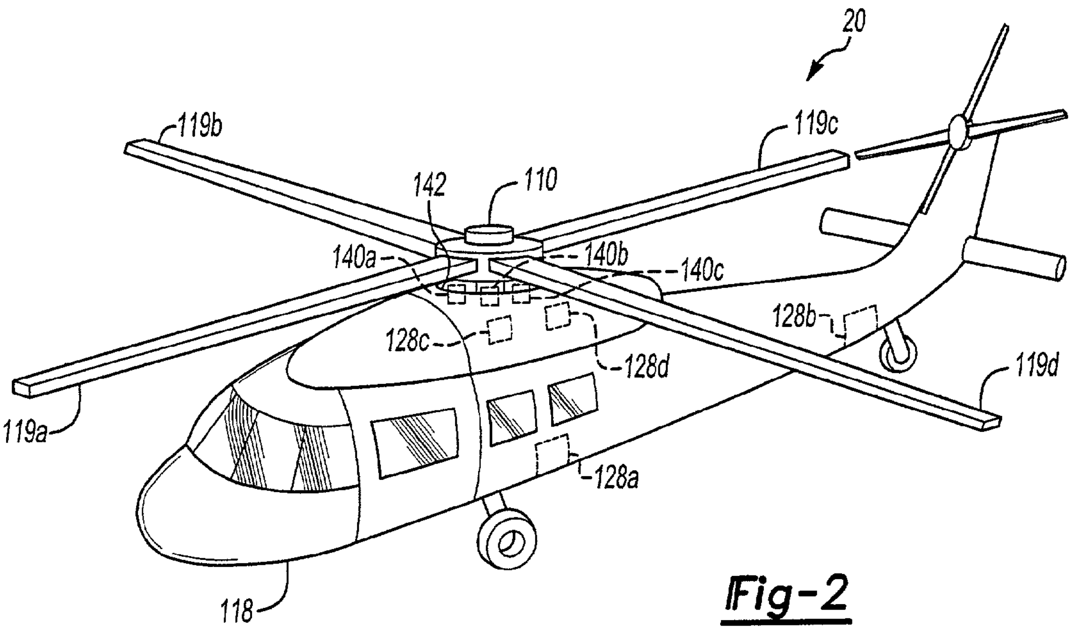
FIG. 2 shows a vehicle in which the present invention may be used.

FIG. 2 shows a perspective view 20 of a vehicle 118 in which the present invention can be used. Vehicle 118, which is typically a helicopter, has rotor blades 119(*a*) . . . (*d*). Gearbox housing 110 is mounted at an upper portion of vehicle 118. Gearbox mounting feet 140(*a*) . . . (*c*) (generally 140) provide a mechanism for affixing gearbox housing 110 to vehicle airframe 142. Sensors 128(*a*) through (*d*) (generally 128) are used to sense acoustic vibration produced by the vehicle, which can be from the rotorblades 119 or the gearbox housing 110. Although only four sensors are shown, there are typically any suitable number of sensors necessary to provide sufficient feedback to the controller (not shown). The sensors 128 may be mounted in the vehicle cabin, on the gearbox mounting feet 140, or to the airframe 142, or to another location on the vehicle 118 that enables vehicle vibrations or acoustic noise to be sensed. Sensors 128 are typically microphones, accelerometers or other sensing devices that are capable of sensing vibration produced by gear clash from the gearbox 110 and generating a signal as a function of the sensed vibration. These sensors generate electrical signals (voltages) that are proportional to the local noise or vibration.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers for steps in the method claims are for ease of reference by dependent claims, and do not indicate a required sequence, unless otherwise indicated.

What is claimed is:

1. A method for reducing sensed physical variables including the steps of:

a) generating a plurality of control commands as a function of the sensed physical variables;

b) generating an estimate of a relationship between the sensed physical variables and the control commands, wherein the estimate is used in said step a) in generating the plurality of control commands;

c) sensing a response by the sensed physical variables to the control commands and updating the estimate of the relationship in said step b) based upon the response by the sensed physical variables to the control commands, wherein the control command in said step a) includes a normalization factor on the convergence rate that depends on said estimate in step b), and wherein said normalization factor is updated based on the update to the estimate.

2. The method according to claim 1 wherein iterations of said step a) are performed at a control rate, and wherein said step c) further includes the steps of:

d) determining a Cholesky decomposition; and e) reducing the computations per iteration of said step a) by splitting the Cholesky decomposition over more than one of said iterations.

3. The method according to claim 2, further including the steps of:

f) generating a matrix of sensed physical variable data ($z_k$); and g) generating a matrix of control command data ($u_k$), wherein $\Delta z_k = T\ \Delta u_k$, and where T is a matrix representing said estimate.

4. The method according to claim 3, further including the step of:

h) updating the T matrix according to $$T_{k+1}=T_k+EK^H$$

where K is a gain matrix and E is residual vector formed as $E=y-T_v$, and where $y_k=\Delta z_k$, and $v_k=\Delta u_k$.

5. The method according to claim 1, wherein iterations of said step a) are performed at a control rate, and wherein said step c) further includes the step of updating a normalization factor on a convergence rate of the function in said step a).

6. A method for reducing sensed physical variables including the steps of:

a) generating a plurality of control commands as a function of the sensed physical variables based upon an estimate of a relationship between the sensed physical variables and the control commands; and b) sensing a response by the sensed physical variables to the control commands and updating the estimate of the relationship in said step a) based upon the response by the sensed physical variables to the control commands by treating the updating of the estimate as a portion of a QR decomposition and solving the QR decomposition.

7. The method according to claim 6, wherein said steps a) and b) include adaptive quasi-steady control logic as a function of $\Delta u_n=-(T_n{}^*T_n+W)^{-1}{}^*T^T{}_n{}^*y_n$.

8. The method according to claim 7 further comprising: reformulating the adaptive quasi-steady control logic into the QR decomposition.

9. The method according to claim 8, wherein the adaptive quasi-steady control logic uses a square root algorithm in which theoretically negative feedback gains are computed as negative feedback gains.

10. The method according to claim 9, further comprising: propagating an estimate of a physical variable $Y_n$ as a function of $Y_n=(W+T_n{}^TT_n)^{-1}$.

11. A system for controlling a plurality of sensed physical variable comprising:

a plurality of sensors for measuring the physical variables;

a control unit generating an estimate of a relationship between the sensed physical variables and a plurality of control commands, and generating the plurality of control commands over time based upon the sensed physical variables and based upon the relationship; and a plurality of force generators activated based upon said plurality of command signals;

wherein the control unit updates the estimate of the relationship based upon a response by the sensed physical variables to the control commands, wherein the control command includes a normalization factor on a convergence rate that depends on said estimate, and wherein said normalization factor is updated based on the update to the estimate.

12. The system according to claim 11 wherein the control unit iteratively generates an estimate of the relationship at a control rate, and wherein the control unit updates the relationship by determining a Cholesky decomposition and by reducing the computations per iteration of generating the estimate of the relationship by splitting the Cholesky decomposition over more than one of said iterations.

13. The system according to claim 12, wherein the control unit generates a matrix of sensed physical variable data ($z_k$) and generates a matrix of control command data ($u_k$) wherein $\Delta z_k=T\ \Delta u\ _k$, and where T is a matrix representing said estimate.

14. The system according to claim 13, wherein the control unit updates the T matrix according to $T_{K+1}=T_K+EK^H$, where K is a gain matrix and E is residual vector formed as $E=y-Tv$, and where $y_k=\Delta z_k$, and $v_k=\Delta u_k$.

15. The system according to claim 11, wherein the control unit iteratively generates control commands at a control rate, and wherein the control unit updates a normalization factor on a convergence rate of the function.

16. A system for controlling a plurality of sensed physical variable comprising:

a plurality of sensors for measuring the physical variables;

a control unit generating an estimate of a relationship between the sensed physical variables and a plurality of control commands, and generating the plurality of control commands over time based upon the sensed physical variables and based upon the relationship, the control unit updating the estimate of the relationship based upon a response by the sensed physical variables to the control commands by treating the updating of the estimate as a portion of a QR decomposition and solving the QR decomposition.

17. The system according to claim 16, wherein the control unit includes adaptive quasi-steady control logic as a function of $\Delta u_n=-(T_n{}^*T_n+W)^{-1}{}^*T^T{}_n{}^*Y_n$.

18. The system according to claim 17 wherein the control unit reformulates the adaptive quasi-steady control logic into the QR decomposition.

19. The system according to claim 18, wherein the adaptive quasi-steady control logic uses a square root algorithm in which theoretically negative feedback gains are computed as negative feedback gains.

20. The system according to claim 19, wherein the control unit propagates an estimate of a physical variable $Y_n$ as a function of $Y_n=(W+T_n{}^TT_n)$.

21. A method for reducing sensed physical variables including the steps of:

a) generating a matrix of sensed physical variable data ($z_k$)

b) generating a matrix of control command data ($u_k$) wherein $\Delta z_k = T\,\Delta u_k$, and where T is a matrix representing an estimate of a relationship between the sensed physical variables and the plurality of control commands;

c) sensing a response by the sensed physical variables ($Z_k$) to the control command data and updating the T matrix according to ($T_{k+1} = T_k + EK^H$ where K is a gain matrix and E is residual vector formed as E=y−Tv, and where $y_k = \Delta Z_k$, and $v_k = \Delta u_k$, wherein the control commands in said step b) include a normalization factor on a convergence rate that depends on the T matrix, and wherein said normalization factor is updated based on the update to the T matrix.

* * * * *